// Patent Number: 4,835,689
// Date of Patent: May 30, 1989
// Inventor: Matthew O'Donnell, Schenectady, N.Y.
// Assignee: General Electric Company, Schenectady, N.Y.

[54] ADAPTIVE COHERENT ENERGY BEAM FORMATION USING PHASE CONJUGATION

[75] Inventor: Matthew O'Donnell, Schenectady, N.Y.

[73] Assignee: General Electric Company, Schenectady, N.Y.

[21] Appl. No.: 99,422

[22] Filed: Sep. 21, 1987

[51] Int. Cl.$^4$ .............................................. G01N 29/00
[52] U.S. Cl. ........................... 364/413.25; 364/413.13; 73/626
[58] Field of Search .............. 364/414, 413.13, 413.25; 128/660.01, 661.01; 73/626

[56] References Cited

U.S. PATENT DOCUMENTS

| | | | |
|---|---|---|---|
| 4,387,597 | 6/1983 | Brandestini | 128/661.01 |
| 4,604,697 | 5/1986 | Luthra et al. | 364/414 |
| 4,611,494 | 9/1986 | Uchiyama | 128/661.01 |
| 4,662,223 | 5/1987 | Riley et al. | 128/661.01 |

Primary Examiner—Jerry Smith
Assistant Examiner—Kimthanh Tbui
Attorney, Agent, or Firm—Geoffrey H. Krauss; James C. Davis, Jr.; Marvin Snyder

[57] ABSTRACT

A method for phase conjugation adaptive reduction of phase aberration effects upon the time delays necessary for information of a beam of coherent energy focused within non-homogeneous medium at a selected range R from, and at an angle $\theta$ with respect to the normal to, the surface of an array of a plurality N of transducers, each for providing a portion of the energy of the beam when excited and for converting energy reflected thereto to a signal therefrom, first bounces from a large collection of scatterers, contained in a portion of the medium to be investigated, a probe beam for that beam angle $\theta$; cross-correlating, for each probe beam, the received signals from each of the (N−1) pairs of adjacent transducers to derive a like number of phase conjugation correction signals; arithmetically operates upon the plurality of phase conjugation correction signals to provide a time correction for the time delay associated with each probe beam transducer, for that range R and angle $\theta$; and then modifies by the time correction for each transducer the time delay of both transducer excitations and return signals received from the media portion to be investigated to reduce phase aberration in the resulting image.

20 Claims, 5 Drawing Sheets

ADAPTIVE COHERENT ENERGY BEAM FORMATION USING PHASE CONJUGATION

BACKGROUND OF THE INVENTION

The present invention relates to coherent energy beam imaging and, more particularly, to a novel method for adaptive formation of the coherent beam, using phase conjugation, to counteract the effects of inhomogeneous wave propagation.

It is well known that phase cancellation effects, introduced by inhomogeneous wave propagation in a medium, limit both the spatial and contrast resolution of images derived from a beam of coherent energy, such as a beam of radar, sonar or ultrasound energy and the like. Phase cancellation effects are most acute for high frequency imaging using large apertures, where small arrival time differences over substantial distances result in large errors in the relative phase across that aperture. For example, in medical ultrasound this occurs because the phase of an interrogating ultrasound wave is distorted due to inhomogeneous distribution of sound velocities in the body through which the ultrasound wave propagates, from the aperture to the region of interest and the subsequent return to the aperture. It is well known that this effect can dominate the appearance of an ultrasound image as both the ultrasonic frequency and the size of the aperture are increased. While several methods have previously been proposed for reducing phase cancellation effects, all such methods operate, if at all, at the expense of spatial resolution. In order to image at the theoretical resolution of the aperture, especially at high frequencies, phase distortion of the incident ultrasound wave must be reduced. In ultrasound imaging, the predominant distortion occurs within the wall of the body being imaged, which can be modeled as a single distorting surface. For all regions of interest deeper than this body wall, it is highly desirable to reduce phase aberration by obtaining accurate information from which phase correction can be computed.

BRIEF SUMMARY OF THE INVENTION

In accordance with the invention, a method for phase conjugation adaptive reduction of phase aberration effects upon the time delays necessary for formation of a beam of coherent energy focused within non-homogeneous medium at a selected range R from, and at an angle $\theta$ with respect to the normal to, the surface of an array of a plurality N of transducers, each for providing a portion of the energy of the beam when excited and for converting energy reflected thereto to a signal therefrom, comprises the steps of: bouncing from a large collection of scatterers, contained in a portion of the medium to be investigated, a probe beam derived from the entire array of transducers; cross-correlating, for each probe beam, the received signals from each of the (N−1) pairs of adjacent transducers to derive a like number of phase conjugation correction signals; arithmetically operating upon the plurality of phase conjugation correction signals to provide a time correction for the time delay associated with each probe beam transducer, for that range R and angle $\theta$; modifying by the time correction for that transducer the time delay used for formation of an actual imaging excitation beam; and then modifying by the time correction for that transducer the time delay of return signals, received from the media portion to be investigated, to reduce phase aberration in the resulting image.

In a presently preferred embodiment, each of the first (N−1) channels of the imaging apparatus has: a phase conjugation processing means for cross-correlating the signals from that channel and the next channel, by complex floating point multiplication; separate means for summing, the real and imaginary portions of the multiplication result; and cordic arctan operating means for providing each one of (N−1) $\Delta\phi$ sets of data to a common system means for providing the correction signal $$\phi_j = \left( \sum_{k=1}^{j} \Delta\phi_k \right)$$

for that j-th channel.

Accordingly, it is an object of the present invention to provide a novel method and apparatus for adaptive beam formation utilizing phase conjugation.

This and other objects of the present invention will become apparent upon a reading of the following detailed description, when considered in conjunction with the drawings.

DETAILED DESCRIPTION OF THE INVENTION

Figure 1:
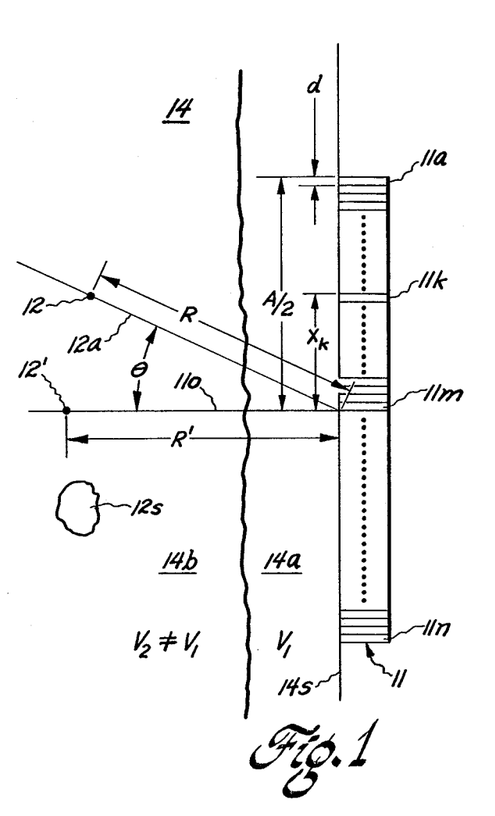
FIG. 1 is a plane view of a transducer array and of a two-layer object to be investigated with an energy beam produced by the array, and useful in defining the problem to be overcome by the present invention.
Figure 1A:
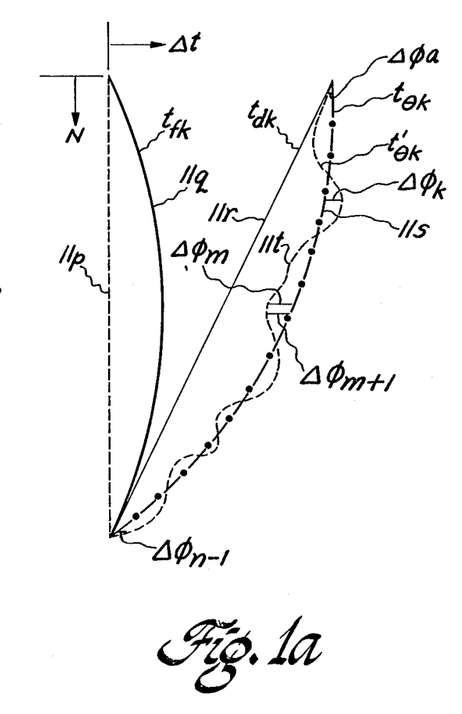
FIG. 1a is a diagram relating transducer element number k versus time delay $\Delta t$, for various observation conditions and useful in understanding several factors concerning the phase aberrations encountered at the output of the transducer array.

Referring initially to FIGS. 1 and 1a, an investigative system 10, utilizing a beam of energy for interrogation of an object, has an array 11 of energy transducers. Array 11 is illustrated as a linear array of a plurality N of transducers 11a, ..., 11k, ... 11m, ... 11n. The transducers have a center-to-center spacing d, with each transducer at a distance $x_k$ from the array centerline 11o, so that the array extends in both directions for an aperture distance A/2 from the array centerline 11o. The array is utilized both to transmit a beam of energy and to receive a return energy response, from a reflector 12, generally positioned along a line 12a at some angle $\theta$ with respect to the normal line 11o perpendicular to the plane of array 11. It is well known that, where array 11 is pressed against the surface 14s of a homogeneous medium 14, the waveform from a reflective location 12', substantially on the array midaxis line 11o and at a range R' sufficiently large with respect to the array aperture A, will arrive substantially simultaneously at each of the array transducers 11k ($a \leq k \leq n$); this waveform 11p (FIG. 1a) thus requires no timing offsets $\Delta t$ at each of the N transducers, i.e. the transducer outputs can all be directly, coherently summed to form the beam at angle $\theta = 0$. It is also well known that as the range R' decreases, the sensors closest to the array center, e.g.

one of the pair of central sensors 11m, where the array has an even number of sensors N=2m, requires a greatest time delay $\Delta t$ than the time delay required by transducers further toward the ends of the array. Thus, to properly focus a beam of energy at a location 12' at a substantially arbitrary range R', a focusing time delay $t_{fk}=(A^2/8R'V)\cdot(1-[2x_k/A]^2)$, illustrated by the focusing correction curve 11q of FIG. 1a, is required to be physically present after each k-th transducer 11k. It is further known that if the beam is steered to a general location 12 at some angle $\theta$ with respect to the midarray orthogonal axis 11o, even at a very large range R, the reflected beam wavefront will first reach that transducer at the end of the array nearest to the angularly-offset location, e.g. here the transducer 11a, and will then progressively reach each successive one of the other transducers in the array, until the transducer at the furthest end therefrom is reached, e.g. here the transducer 11n. A substantially linear curve 11r of transducer delay time $t_{dk}=t_{cm}+(k-1)(d/V)\sin\theta$ must be provided (where $t_{cm}$ is a midarray element m delay time chosen to be slightly greater than $(md/V)\sin\theta$, so that all $t_{dk}$ are positive, and $\theta$ is now defined as a negative angle if "above" line 11o); $t_{dk}$ is provided to increasingly delay the output of each transducer from the nearest end to the furthest end of the array. When an off-axis point 12, at angle $\theta$ and relatively close range R is to be imaged, both the focusing and the angular steering corrections must be made, such that the individual total time delay $t_{\theta k}$, for each transducer k, is given by:

$$t_{k\theta}=t_{cm}+(k-1)(d/V)\sin\theta+(A^2/8RV)(1-[2x_k/A]^2)\cos 2\theta$$

and is shown by chainline curve 11s. However, this is true only if the medium 14 is substantially homogeneous between the transducer array 11 and the point 12 to which the energy beam is steered.

If the medium is not homogeneous, as might occur if first encountered layer 14a has a first velocity of energy propagation $V_1$ and a second encountered layer $14_b$ has a second propagation velocity $V_2$ (different then first layer propagation velocity $V_1$), then the time delay necessary for properly focusing and steering the beam to any point 12 depends upon the extent of the non-homogeneous medium layer 14a intervening between a particular transducer 11k and any point 12 in the sample under investigation. That is, the time delay curve 11t is, if ascertainable at all, extremely nonlinear and requires for each transducer a total transducer time delay $t'_{k\theta}$ which not only includes the focusing and delay times $t_{fk}$ and $t_{dk}$ but also requires an additional time delay $\Delta t_{k\theta}$ to counteract the phase distortion $\Delta\phi_k$ which the energy returning to each transducer k has been subjected to by crossing different thicknesses of at least layer 14a. If the particular point 12 could be made to function as a point source, then the amount of phase distortion $\Delta\phi_k$ that each transducer k has been subjected to could be determined. Thus, the first transducer 11a would have a phase distortion $\Delta\phi_a$ such that the total delay time associated with that transducer must be changed from that value $t_{a\theta}$ given by the ideal curve 11s while other transducers may require a time delay $\Delta\phi_k$, which modifies the ideal time delay given by curve 11s. In addition, because of the inhomogeneous propagation velocity distribution in layer 14, the amount of phase distortion $\Delta\phi_m$ at any one transducer need have no relationship to the phase distortion $\Delta\phi_{m+1}$ at the next adjacent transducer. It is highly desirable to measure the phase distortion and compute correction factors for use in establishing the time delay associated with each transducer 11k of the array. My method uses a probe beam of transmitted energy from transducer array 11 and reflection from any scattering means 12s (and especially a large distribution of scatterers) in layer 14, so that the phase aberrations, or distortion pattern, induced by propagation through a spatially inhomogenous medium can be obtained and then used to at least partially correct the required time delays in a sampled-aperture coherent imaging system.

Figures 2, 2D:
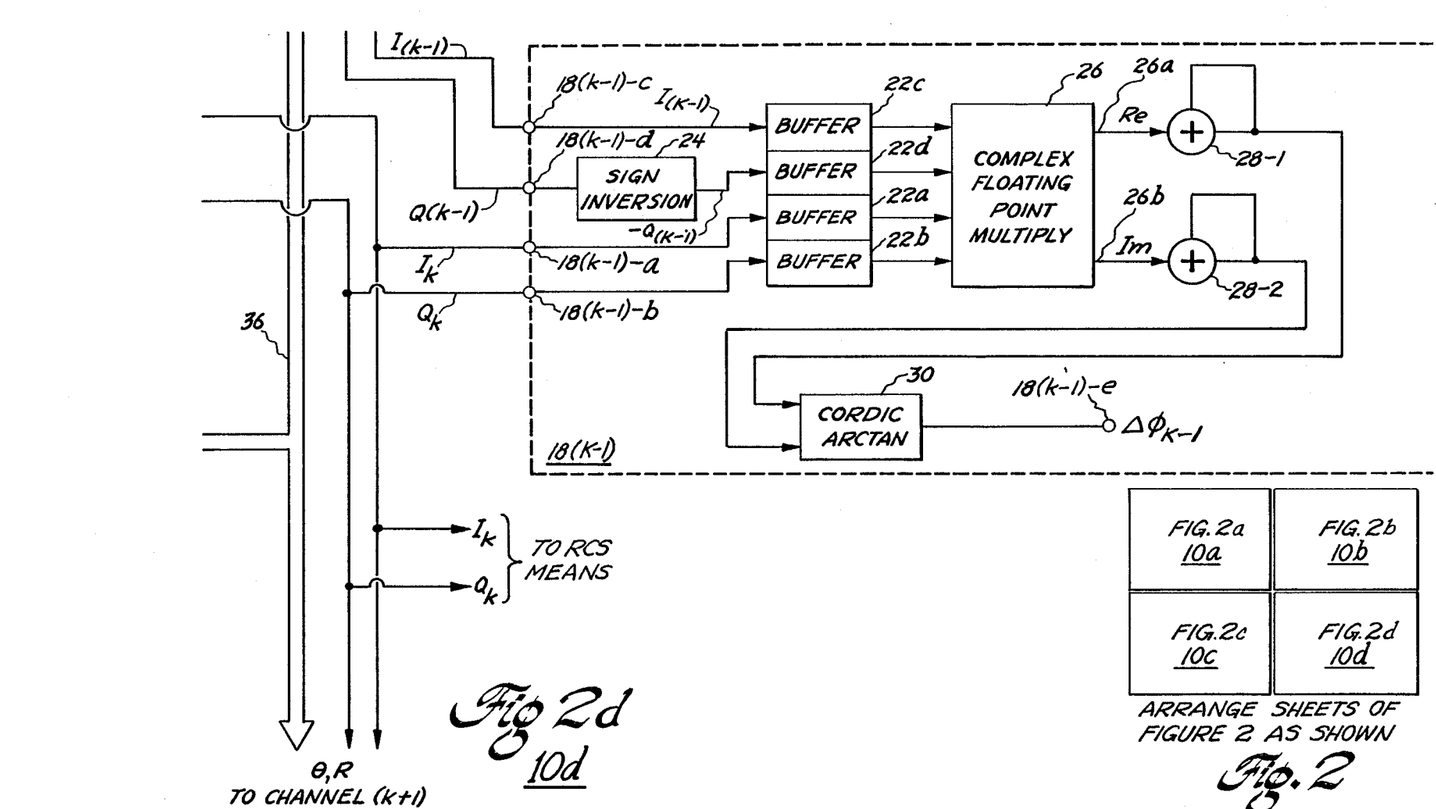
FIGS. 2a–d arranged as FIG. 2 are a schematic block diagram of a portion of an ultrasound imaging system utilizing my novel method of phase conjugation for adaptive beam formation to reduce phase distortion.
Figure 2A:
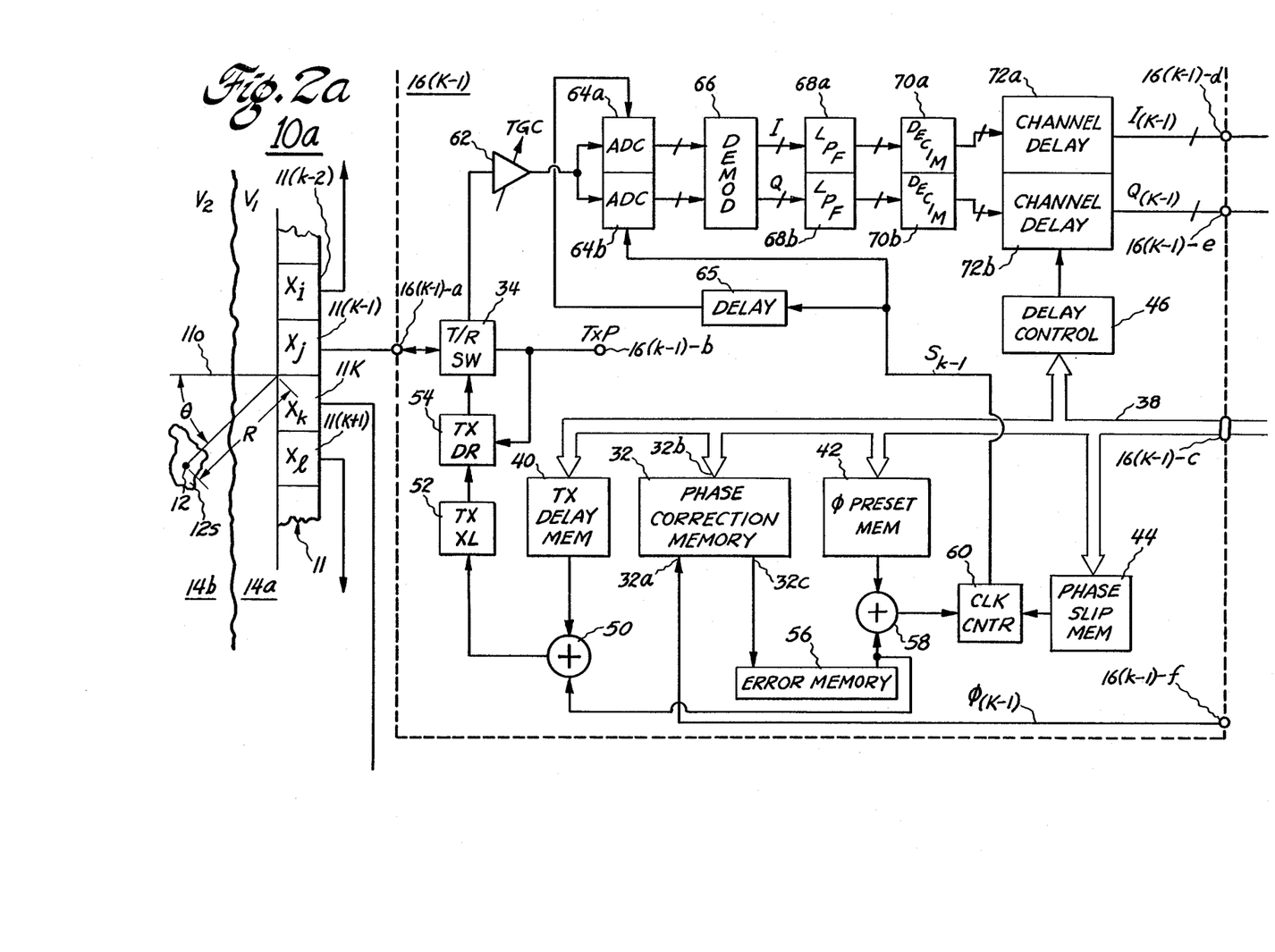
Figure 2B:
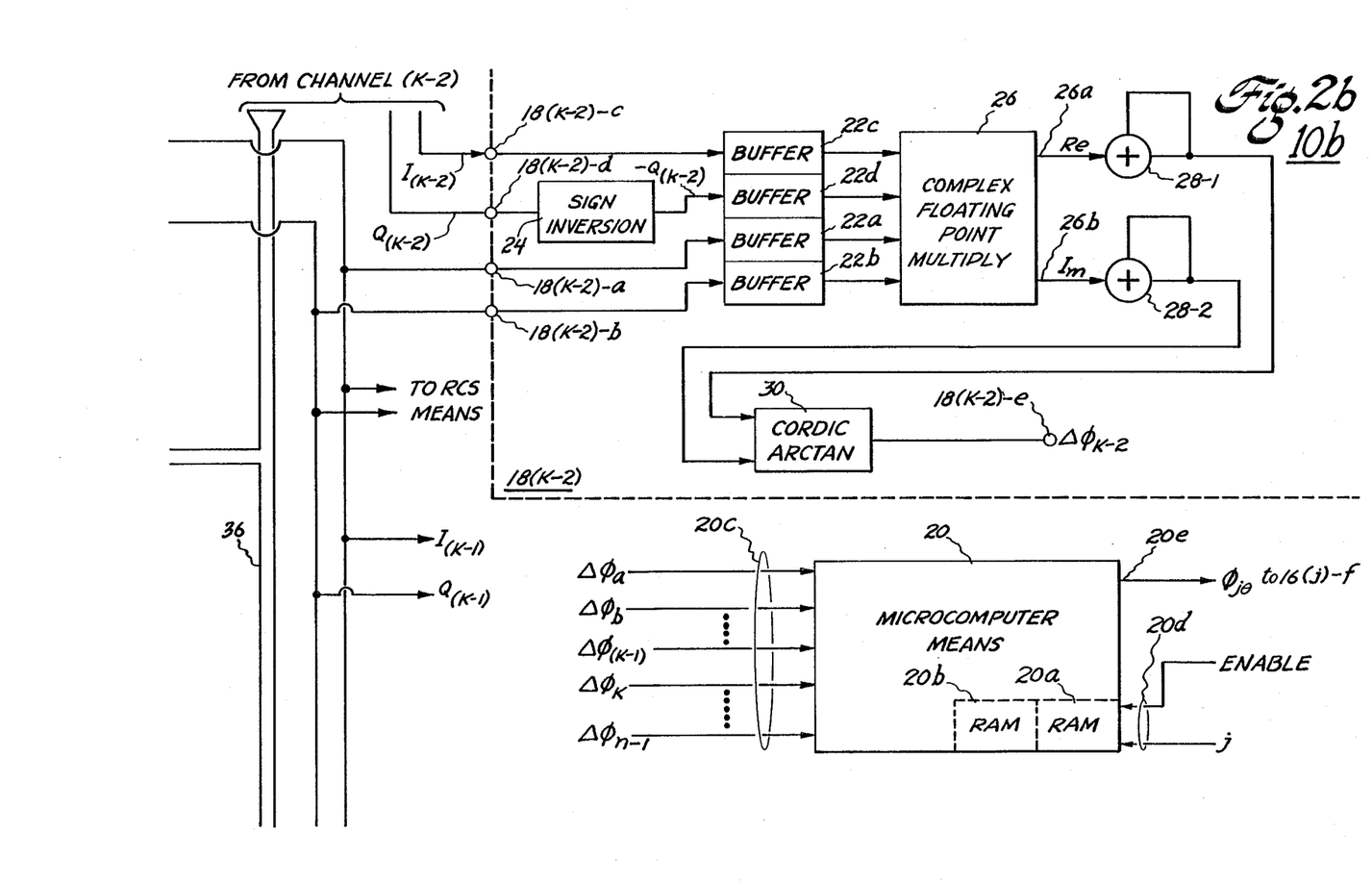
Figure 2C:
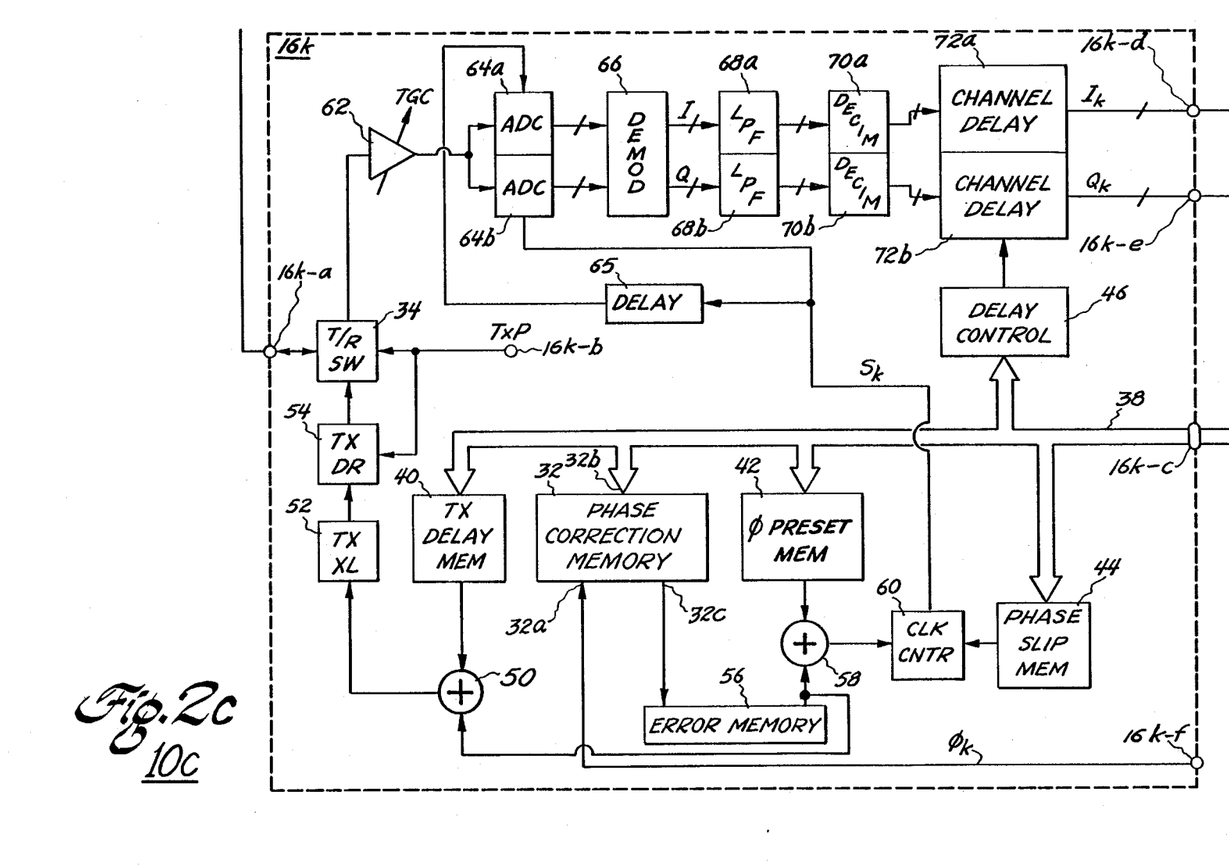

Referring now to FIG. 2, for an exemplary ultrasonic energy imaging system 10, the beam 12a can be steered, focused and adaptively formed to substantially overcome phase distortion effects, utilizing the phase conjugation method of my invention. Each of the transducers 11k has associated therewith a front end portion 16k containing (a) means for exciting the transducer to transmit an interrogation beam, and (b) means for processing received energy from the transducer to form a reception beam. Associated with all-but-one of the front end means 16k, is a phase conjugation processing means 18k for determining the phase distortion $\Delta\phi_k$ between the return signal in that channel and the return signal in an immediately adjacent channel. As there are N channels to be compared in successive pairs, only (N−1) phase aberration signals $\Delta\phi$ will be generated. Means 20 is provided for computing the individual channel j phase conjugation correction signals $\phi_j$ responsive to receipt of the individual transducer phase distortion quantities $\Delta\phi_k$. Thus, each phase difference results in a time delay error, due to inhomogeneous propagation within the medium, where the time delay error $\Delta t_j$ for the j-th channel and beam angle $\theta$ is $\Delta t_{j\theta}=\phi_{j\theta}/\omega_O$, where $\omega_O$ is the frequency of the beam energy used for interrogation of the medium, and $$\phi_{j\theta} = \sum_{k=1}^{j} \Delta\phi_k$$

the j-th transducer transmitting. Means 20 for computing the $\phi_j$ value can be any suitable microcomputer having associated random access memory RAM means 20a and stored program read-only memory ROM means 20b; microcomputer 20 operates to sum all of the $\Delta\phi_k$ quantities, as might be provided at a multiplexible microcomputer means input 20c responsive to receipt of an enable signal and a channel j number at a control interface 20d. Each enablement of means 20 can be responsive to the transmission of a probe beam at an angle $\theta$, typically prior to the actual data-gathering beam transmission at the same angle $\theta$ or at an angle $\theta'$ close to angle $\theta$. A typical phased-array sector scanning (PASS) transducer array might scan through a 90° sector with $2^7=128$ different beams (with angular resolution therefor of about 0.7° per beam steering angle). If, to save time, all beam angles do not have probe beams sent therefrom and phase correction $\Delta\phi_k$ data calculated therefore, then probe beams for one out of every few consecutive beam numbers might be used. Thus, prior to accepting data for a beam at some angle $\theta$, a probe beam is sent out; each transducer is still provided with that transmit delay which would be needed for forming (steering and focusing) all transducer outputs into a beam at the selected angle $\theta$ and range R. All N transducers also convert the returned probe beam energy received thereat to an electrical signal, for processing in means 16, 18 and 20 to yield a phase distortion correction data value $\Delta\phi_k$, and thus a phase conjugation correction time delay $\Delta t_{k\theta} = \phi_{k\theta}/\omega_o$, for that one channel k at the a probe beam direction $\theta$.

The necessary correction is a time delay, where the time delay error $\Delta t_{m\theta} = T_m - T_{m-1}$, for signals on a pair of adjacent channels m and (m−1) and where $T_m$ is the time interval from transmission of the probe beam by the designated transducer m, to return signal reception by the particular m-th transducer. Thus, the k-th channel signal is $S_k(t) = S(t - T_k)$ and the signal on the (k−1)-th channel is $S_{k-1}(t) = S(t - T_{k-1})$. If the pair of adjacent channel signals are converted to baseband and then cross-correlated, $$S_k(t) = C(t - T_k)\exp(-i\omega_O(t - T_k)), \text{ and}$$

$$S_{k-1}(t) = C(t - T_{k-1})\exp(-i\omega_O(t - T_{k-1})),$$

where C(t) is a probe beam envelope shape function, and the cross-correlation function R(t) is given by $$R(t) = \int_{-\infty}^{+\infty} S_k(t + t')S_{k-1}(t')dt'.$$

This is equivalent to $$R(t) = \exp(-i\omega_0(t - (T_k - T_{k-1}))) \int_{-\infty}^{+\infty} C(t + t' - T_k)C(t' - T_{k-1})dt'.$$

However, it will be seen that the integral is just the autocorrelation function A of the envelope (env) evaluated at time $(t - (T_k - T_{k-1}))$ Therefore, the baseband cross-correlation function becomes $$R(t) = \exp(-i\omega_O(t - (T_k - T_{k-1})))A(t - (T_k - T_{k-1})),$$

so that the phase of the cross-correlation function, at any time t is related to the time error as $\phi(t) = -\omega_O(t - \Delta t)$. Therefore, if $\phi(t)$ can be measured at any time where $A(t - \Delta t)$ is large, a very good estimation of the time error will be obtained. Since the time shift $\Delta t$ is relatively short compared to the envelope duration T, i.e. $\Delta t << T$, then $A(t - \Delta t)$ is very near maximum at time $t = 0$. Therefore, a measurement of the phase at $t = 0$ is given by $\Delta\phi_k(0) = \omega_O \Delta t_k$, so that $\Delta t_k = \Delta\phi_k(0)/\omega_O$, will be the optimum estimate of the required time shift $\Delta t_k$. The baseband signal is typically obtained as a pair of signals, i.e. an in-phase I baseband signal and a quadrature-phase Q baseband signal, having a $t = 0$ cross-correlation function $$R_k(0) = \int_{-\infty}^{+\infty} [[I_k(t') + iQ_k(t')][I_{k-1}(t') - iQ_{k-1}t']dt,$$

so that, for a sampled system, $$R_k(0) = \sum_{m=0}^{M} [I_k(m) + iQ_k(m)][I_{k-1}(m) - iQ_{k-1}(m)]$$

where M is the number of sample points used to approximate the infinite time integral. Therefore, the $\Delta\phi_k$ calculations can be carried out by computating the cordic arctangent of R(0), i.e. by accumulating the real and imaginary parts of the result of a complex multiplication between the baseband signals on two adjacent channels k and (k−1), to form $R_k(0)$ in each of the (N−1) means 18, and then accumulating the imaginary and real parts of all $R_k(0)$ terms to form R(0), from which the ratio of Im(R(O)) to Re(R(O)) is calculating in means 20, to derive each correction data $\Delta\phi_k$.

In accordance with one aspect of my invention, each means IS comprises: a set of buffer means 22 for temporarily storing the I and Q data from each of the involved two adjacent channels; a sign inversion means 24 for inverting the sign of the Q data from the first channel, prior to storage of that data in buffer means 22d; a complex floating point multiplication means 26; a pair of adders 28-1 and 28-2; and a cordic arctan computing means 30. Thus, means 18(k−2) is associated with the (k−2)-nd channel, or transducer, and receives from the next, e.g. (k−1)-st, front end means the in-phase $I_{(k-1)}$ data at a first input 18(k−2)-a, for storage in the first buffer means 22a, and the quadrature-phase $Q_{(k-1)}$ data at a second input 18(k−2)-b for storage in second buffer means 22b. Means 18(k−2) also receives the I and Q data from the associated (k−2)-nd channel, e.g. the last channel in-phase $I_{(k-2)}$ data is received at input 18(k−2)-c for storage in third buffer means 22c, and the last channel quadrature-phase $Q_{(k-2)}$ data is received at input 18(k−2)-d, is sign inverted in means 24, and the $-Q_{(k-2)}$ data is stored in fourth buffer means 22d. Similarly, in means 18(k−1), the next channel front end in-phase data $I_k$ is received at input 18(k−1)-a and stored in first buffer 22a, while the next channel quadrature-phase $Q_k$ data is received at input 18(k−1)-b and stored in second buffer 22b. Input 18(k−1)-c receives the in-phase $I_{(k-1)}$ *data from the associated channel front end, for storage in buffer* 22c, while the quadrature-phase data $Q_{(k-1)}$ is received at fourth input 18(k−1)-d, is sign inverted in means 24 and the $-Q_{(k-1)}$ *data is stored in buffer* 22d. The complex floating point multiplier means 26 in the k-th means 18k utilizes the four data quantities in buffer means 22 to provide the real Re and imaginary Im portions of the quantity $([I_k(j) + iQ_k(j)][I_{k-1}(j) - iQ_{k-1}(j)])$, at respective outputs 26a and 26b for finding each of the constituents of the R(0) summation. The real or imaginary parts are each summed in one of real term summer means 28-1 or imaginary term summer means 28-2. The summed signals are provided to the cordic arctan means 30 which provides the $\Delta\phi_k$ data to output 18k-e. It is these $\Delta\phi_k$ data terms which are accepted in sequence by the multiplexing microcomputer means input port 20c, for calculation of the $\phi_{j\theta}$ value for each of the $1 \leq j \leq n$ channels.

This $\phi_{j\theta}$ information is fed back to the phase correction data input terminal 16j-f of the selected j-th front end means. Thus, when a probe beam at an angle $\theta$ is transmitted from transducer array 11, the (n−1) pairs of phase distortion data $\Delta\phi_k$ are processed by means 20 and a correction time $\Delta t_{j\theta} = \phi_{j\phi\theta}/\omega_o$ can be calculated from the $\phi_{j\theta}$ data provided at the terminal 16(k−1)-f. The $\Delta t_{j\theta}$ data is therefore entered into the channel phase correction memory means 32, via a first input port 32a thereof. Similarly, the phase correction memory means 32 of the k-th channel receives the $\Delta t_{k\theta}$ data provided to that channel's phase correction data input 16k-f terminal.

Each channel front end means 16k, where $1 \leq k \leq N$, has a transducer node 16k-a connected to the associated k-th transducer 11k. A transmission pulse $T_xP$ control signal is applied to the transmission control input 16$k$-b of the channel means to switch the connection of transducer terminal 16$k$-a through a transmit/receive switch means 34 from a receive portion to a transmit portion of the channel front end means. With the exception of the phase correction memory 32, error memory means 56 and associated adder means 58 to be discussed hereinbelow, all of the other channel front end means are well known into the art (see, e.g. co-pending applications Ser. No. 056,177 and Ser. No. 944,4S2, respectively filed June 1, 1987 and Dec. 19, 1986, assigned to the assignee of the present application and incorporated herein in their entireties by reference) and will be only briefly described herein. Each k-th channel front end means 16$k$ has a data bus 16$k$-c input which receives angle $\theta$ and range R information from a system data bus means 36, so that a front end internal data bus 38 can route this information in parallel to a second input port 32$b$ of phase correction memory 32, and to a transmission Tx delay memory means 40, a reception phase preset memory means 42, a reception phase slip memory means 44 and a reception delay control means 46 in each channel. The normal transmission delay data, for forming energy from this k-th one of the N transducers into a beam focused on a small region 12 at angle $\theta$ and range R comes from means 40, is added to the contents of error memory 56 in adder 50, and the sum is forwarded to a transmission control (TX XL) means 52 for establishing the timing of the transmission pulse from a transmission driver (TX DR) means 54, which provides a transmission pulse of RF ultrasonic energy through T/R switch means 34, to the associated transducer 11$k$. When the Tx pulse at node 16$k$-b ends, the channel switches to the receive (Rx) mode of operation. The phase correction memory provides $\Delta t_{k\theta}$ data at an output port 32$c$; the data thereat is held for temporary storage in an error memory means 56. The received signal phase correction time $\Delta t_{k\theta}$ is added, in means 58, to the phase preset data previously entered in memory means 42 for the particular angle $\theta$ and range R. This data, plus the phase slip data from memory means 44, is loaded into a clock counter means 60, which provides a reception sample strobe clock signal $S_k$. Each reception portion of each channel front end means contains a time-gain-controlled amplifier means 62 and a plurality of high-speed analog-to-digital converter ADC means 64, as well as a delay means 65 for causing interdigitated sampling of the gain-controlled received beam energy. The digital data from each of the ADC means is demodulated to baseband by a demodulation means 66, and the in-phase I or quadrature-phase Q baseband data is then low-pass-filtered, in LPF means 68$a$ or 68$b$ before being decimated in a digital data decimator means 70$a$ or 70$b$. The decimated in-phase or quadrature-phase data is then respectively delayed in a channel delay register means 72$a$ or 72$b$, having a delay time $t_d$ established by the delay control means 46 for the particular channel, and providing the channel output in-phase $I_k$ data at channel output 16$k$d or the channel quadrature-phase $Q_k$ data at channel output 16$k$-e. It is this data that is forwarded to (a) the RCS means (not shown) for providing the in-phase and quadrature-phase resulting-coherent-sum (RCS) data from which the displayable images are derived, and (b) the associated pair of processing means 18($k-1$) and 18$k$.

In operation, a probe beam is formed by exciting all of the transducer elements with a time delay sequence corresponding to a beam steered to an angle $\theta$ and focused to a range R (provided via delay memory 40, transmission controller 52, and transmission driver 54) as if a completely uniform medium were being dealt with. During reception, as the complex correlator sums are computed by means 20, the receive-beam-forming electronics of each means 16 is continuously reconfigured for dynamic focus (provided via ADC means 64, digital baseband demod means 66, low pass filter means 68, decimator means 70, channel delay means 72, delay control means 46, phase slip memory means 44, and clock control means 60) so that the phase correction modification time $\Delta t_{k\theta}$ for each channel results substantially solely from propagation errors. Thus, the probe beam pulse is returned from the scatterers 12$s$ within the actual, non-uniform media, and the individual signals on each of the plurality N of channels are each processed into an in-phase $I_m$ component and a quadrature-phase $Q_m$ component for each m-th channel thereof. These $I_m$ and $Q_m$ signals are then fed in pairs from means 16 into the plurality (N−1) of complex correlator means 18 to calculate the $\Delta\phi_k$ errors for each of the (N−1) pairs of adjacent channels. Means 20 receives and sequentially accumulates the $\Delta\phi_k$ errors to derive the phase correction factors $\phi_{k\theta}$ to be used in each of the N channels for the angle $\theta$ corresponding to the probe beam direction. This process occurs for all probe direction angles $\Theta$. Although probe beams can be provided in every beam direction in the corrected image, it should be understood that a probe beam need not be provided in every beam direction. A single probe beam can be used to derive correction phases for all of the plurality N of elements over a set P (typically, with P=2 to P=16) of adjacent image beams. It should be understood that each of a plurality of substantially identical front-end integrated circuit chips will provide at least one front-end portion 16; it should also be understood that each of a plurality of substantially identical circuit processing chips will provide at least one cross-correlation processing portions 18. If the same number of front-end ICs and cross-correlation processor ICs are used, then each processing chip can be located adjacent to the front-end chip for the associated channel(s). The single microcomputer means 20 can be connected to the means 18 ICs with appropriate bus means. It will be understood that this arrangement allows all of the front-end chips to be substantially adjacent to the N transducers of array 11.

After the system has caused the transducer array to provide a probe beam at angle $\theta$ and all of the phase correction $\phi_{k\theta}$ data are calculated, the system controller causes all of the N channels to substantially simultaneously transmit excitation for that angle $\theta$ and range R, and to process the return signals, utilizing the proper phase distortion data in each channel to at least partially correct the phase distortion therein; the resulting I and Q signals are processed, by known means, to find resulting coherent sum (RCS) signals from which displayable images are formed. It will be understood that a plurality of insonifications at the same angle and range can be utilized, with the reduced-aberration RCS signals being averaged, if desired. As previously mentioned, in the interest of reducing the time required for probing at each of the multiplicity of angles $\theta$ (of which there could be e.g. $2^7=128$), each imaging excitation beam need not have a probe excitation beam issued therewith. For example, every other beam angle could be utilized for probe beam excitation; the phase correction data for the intermediate imaging angles would result from interpolation of the adjacent probe beam angles. It should be understood that the greater the number of independent probe beams, generally the better the resulting phase aberration correction. It will also be understood that if the configuration of the layers 14 is time variable, as will usually be encountered in medical ultrasonic imaging wherein transducer array 11 rests up against an exterior surface of a portion of human anatomy which will be changing location with time (due to breathing, pulsatile blood flow, and the like phenomena) then storage of the correction factor for all imaging angles is inappropriate (since these factors are likely to have changed between a first insonification at a particular angle $\theta$ and a later insonification at that same angle $\theta$) due to natural body movement, so that phase correction memory 32 need not be present, and the phase correction data from each probing is entered directly into error memory 56, but is immediately discarded after the next imaging insonification (or the next V sequential insonifications, if a V-average technique is in use). Subsequent imaging insonifications at the same angle require that a new probing process take place prior to the actual data-taking procedure, to find at that particular time the phase-correction data for each of the N channels.

While the presently preferred embodiment of my novel method and apparatus has been presented herein by way of explanation, many variations and modifications will now become apparent to those skilled in the art. For example, although the invention is described with respect to phased-array ultrasound imaging, it should be understood that this invention is also applicable to other coherent imaging forms, such as radar, sonar, and the like. It is my intent, therefore, to be limited only by the scope of the appended claims.

What I claim is:

1. A method for adaptive reduction of phase aberration effects upon the time delays needed for focusing a beam of coherent energy within non-homogeneous media at a selected range R from, and at an angle $\theta$ with respect to the normal to, the surface of an array of a plurality N of transducers each for providing a portion of the energy of the beam when excited and for thereafter converting energy incident thereon to a signal thereform, comprising the steps of:
   (a) bouncing from scatterers, naturally contained in at least a portion of the media to be investigated, a probe beam originating from the plurality N of transducers;
   (b) cross-correlating, for each probe beam, the received signals from a k-th one, where $1 \leq k \leq N$, of the transducers and an adjacent (k−1)-st transducer of the (N−1) successive pairs of adjacent ones of all N transducers to produce a like number (N−1) of phase conjugation correction signals $\Delta\phi_k$;
   (c) arithmetically operating upon the plurality of phase conjugation correction signals $\Delta\phi_k$ to produce a time correction $\Delta t_{j\theta}$ for the time delay associated with that one probe beam at an angle $\theta$ and transducer j for that range R;
   (d) then modifying the time correction $\Delta t_{j\theta}$ for that j-th transducer, the time delay for exciting a reduced aberration imaging beam, in the inhomogeneous media and steered substantially to angle $\theta$ and focused substantially to range R; and
   (e) then modifying by the time correction for that transducer the time delay of return signals, received from the media to be investigated, to reduce phase aberration in the data gathered for generating a displayable image of the media.

2. The method of claim 1, wherein step (a) comprises the step of setting $\theta$ to include all of the beams in a selected imaging set.

3. The method of claim 2, further including the step of repeating steps (a)–(e) for every repetition of any imaging sequence.

4. The method of claim 1, wherein step (a) comprises the step of including every m-th one, where m is greater than 1, of the N beams in the selected imaging set; and further including the step of interpolating between the time corrections for the nearest adjacent beams in the probe beam set, to obtain time delay corrections for imaging beams not included in the set of probe beams.

5. The method of claim 4, further including the step of repeating steps (a)–(e) for every repetition of any imaging sequence.

6. The method of claim 1, wherein step (b) includes the steps of: converting the received signal from each k-th transducer into a digital baseband data signal; and cross-correlating, for the first (N−1) channels, the pair of k-th and (k+1)-st data signals to provide the phase conjugation error signal $\Delta\phi_k$ from the k-th channel.

7. The method of claim 6, wherein each of the baseband data signals is a quadrature data signal having an in-phase component $I_k$ and a quadrature-phase component $Q_k$, in a like-numbered k-th channel; and the cross-correlating step includes the step of complexly multiplying the pair of quadrature data signals.

8. The method of claim 7, wherein step (b) further includes the steps of: deriving, for each of the first (N−1) channels of the array, the $\Delta\phi_k$ data term from a trigonometric ratio of a real portion and an imaginary portion of each complexly multiplied pair of adjacent channel signals; and summing the first to the j-th ones of the $\Delta\phi_k$ terms to provide the phase conjugation correction signal $\Delta\phi_k$ for the j-th transducer of the probe beam.

9. The method of claim 6, wherein for each transducer 1 through (N−1), step (b) further includes the steps of: receiving an in-phase component $I_{k+1}$ and a quadrature-phase component $Q_{k+1}$ from the (k+1)-st next channel; inverting the sign of the $Q_{k+1}$ component; for each k-th channel, complexly multiplying the pair of $I_k$ and $Q_k$ data and the pair of $I_{k+1}$ and $Q_{k+1}$ data; separately accumulating the real and imaginary terms of the complex product; and providing the $\Delta\phi_k$ term, for that k-th channel, as the arctangent of the ratio of the imaginary and real sums.

10. The method of claim 1, wherein step (c) includes the steps of: summing the first to the j-th ones of the phase conjugation signals $\Delta\phi_k$ to produce a phase correction data signal $\phi_{j\theta}$; and dividing the phase correction data signal by the average frequency $\omega_o$ of the beam energy to provide the time delay $\Delta t_{j\theta}$.

11. Apparatus for adaptive reduction of phase aberration effects upon the time delays needed for focusing of a beam of coherent energy within non-homogeneous media at a selected range R from, and at an angle $\theta$ with respect to the normal to, the surface of an array of a plurality N of transducers, each for providing a portion of the energy of the beam when excited and for converting energy reflected thereto to a signal therefrom, comprising:
   means for causing a probe beam from each different and sequential one of a selected set of probe beams to bounce from scatterers naturally contained in at least a portion of the media to be investigated and be received by substantially all transducers of the array;

phase conjugation processing means for cross-correlating, for each probe beam, the received signals from each k-th one, where $1 \leq k \leq N$, of the $(N-1)$ successive pairs of adjacent transducers to produce a like number of phase conjugation correction signals $\Delta\phi_k$;

means for arithmetically operating upon the plurality of phase conjugation signals $\Delta\phi_k$ to produce a time correction $\Delta t_{j\theta}$ for the time delay associated with that one transducer for that range R and angle $\theta$;

means associated with each transducer for then modifying by the time correction for that transducer the time delay for exciting a reduced-aberration imaging beam in the inhomogeneous medium and steered substantially to angle $\theta$ and focused substantially to range R; and means associated with each transducer for then modifying by the time correction for that transducer the time delay of return signals, received from the media to be investigated responsive to excitation by the reduced-aberration imaging beam, to reduce phase aberration in the data gathered for generating a displayable image of the media.

12. The apparatus of claim 11, wherein the causing means includes means for converting the received signal from each k-th transducer into a digital baseband data signal; and each processing means, for the first $(N-1)$ channels, cross-correlates the pair of k-th and $(k+1)$-st data signals to provide the phase conjugation error signal $\Delta\phi_k$ from the k-th channel.

13. The apparatus of claim 12, wherein each of the baseband data signals is a quadrature data signal; and the k-th channel processing means includes means for complexly multiplying the pair of quadrature data signals from the k-th channel and the $(k+1)$-st channel.

14. The apparatus of claim 13, wherein each k-th channel baseband quadrature data signal has an in-phase component $I_k$ and a quadrature-phase component $Q_k$; and the k-th channel processing means receives the $I_k$ and $Q_k$ components from the k-th channel and the $I_{k+1}$ and $Q_{k+1}$ components from the $(k+1)$-st channel.

15. The apparatus of claim 14, wherein each complexly multiplying means provides separate output of the real portion and the imaginary portion of the product of $(I_k + iQ_k)$ and $(I_{k+1} - iQ_{k+1})$.

16. The apparatus of claim 15, wherein each processing means further includes: means for separately accumulating the real portion output and the imaginary portion output of the complexly multiplying means; and means for taking a trigonometric ratio of the accumulated real and imaginary portion signals to provide the phase conjugation error data signal $\Delta\phi_k$ for the k-th channel.

17. The apparatus of claim 16, wherein the arithmetically operation means includes means for summing the first to the j-th ones of the $\Delta\phi_k$ data signals to provide the phase conjugation correction signal $\phi_{j\theta}$ for the j-th transducer last providing a probe beam at angle $\theta$.

18. The apparatus of claim 14, wherein each processing means further includes means for inverting the sign of the $Q_{k+1}$ component.

19. The apparatus of claim 18, wherein each processing means further includes means for storing the received $I_k$, $Q_k$, $I_{k+1}$ and inverted-sign $Q_{k+1}$ components.

20. The apparatus of claim 11, wherein the arithmetically operating means includes microcomputer means for summing the first to the j-th ones of the phase conjugation signals $\Delta\phi_k$ to produce a phase correction data signal $\phi j\theta$; and dividing the phase correction data signal by the average frequency $\omega_o$ of the beam energy to provide the time delay $\Delta t_{j\theta}$.

* * * * *